US012802533B2

(12) United States Patent
Reichert et al.

(10) Patent No.: US 12,802,533 B2
(45) Date of Patent: Nov. 17, 2026

(54) SYSTEM AND METHOD FOR PROVIDING CUSTOMIZABLE CHECKOUT EXPERIENCES

(71) Applicant: Bold Innovation Group Ltd., Winnipeg (CA)

(72) Inventors: Jonathan Reichert, Winnipeg (CA); Yvan Boisjoli, Ile des Chenes (CA); Heidi Deras, Winnipeg (CA); Aaron Copiak, Winnipeg (CA); Jordan Stephensen, Toronto (CA); Matthew Zimmerman, Austin, TX (US); Jordan Labelle, Winnipeg (CA)

(73) Assignee: Bold Innovation Group Ltd., Winnipeg (CA)

( * ) Notice: Subject to any disclaimer, the term of this patent is extended or adjusted under 35 U.S.C. 154(b) by 194 days.

(21) Appl. No.: 18/473,048

(22) Filed: Sep. 22, 2023

(65) Prior Publication Data

US 2025/0104540 A1 Mar. 27, 2025

(51) Int. Cl.
*G07G 1/00* (2006.01)
*H04L 67/303* (2022.01)
*H04L 67/306* (2022.01)

(52) U.S. Cl.
CPC ......... *G07G 1/0036* (2013.01); *G07G 1/0009* (2013.01); *H04L 67/303* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 7,756,752 B2 * | 7/2010 | Duvall | G06Q 30/0641 709/219 |
| 8,155,999 B2 | 4/2012 | Boer et al. | |
| 9,953,378 B2 | 4/2018 | Purves et al. | |
| 2007/0043626 A1 * | 2/2007 | Duvall | G06Q 30/0603 705/26.8 |
| 2012/0215648 A1 * | 8/2012 | Rose | A63F 13/00 705/16 |
| 2013/0290203 A1 * | 10/2013 | Purves | G06Q 10/40 705/319 |

(Continued)

OTHER PUBLICATIONS

Checkout Flows™ 101: Tailored Experiences For Customer Profitability by Anatolli Iakimets, published Jun. 17, 2023 (Jun. 17, 2023), etrieved from Checkout flows 101 ; Bold Commerce "https://boldcommerce.com/blog/checkout-flows-101".

(Continued)

*Primary Examiner* — William J Jacob
(74) *Attorney, Agent, or Firm* — Fasken Martineau Dumoulin LLP; Johann Gest

(57) ABSTRACT

Checkout flows enable retail brands to provide customized checkout experiences based on a customer's unique characteristics. A checkout flow includes the customer segmentation, flow selection, and metric generation stages. When a customer enters a checkout, a process begins to evaluate the customer's characteristics and categorize them into a customer segment. Each segment is served a different frontend, which is specified by the checkout flow identifier. The frontend includes a basic checkout experience, which is customized further by experience optimizers and business optimizers.

10 Claims, 13 Drawing Sheets

(56) References Cited

U.S. PATENT DOCUMENTS

| | | | | |
|---|---|---|---|---|
| 2013/0325663 | A1* | 12/2013 | Scipioni | G06Q 30/0601 705/26.43 |
| 2016/0035005 | A1* | 2/2016 | Kumar | G06Q 30/0633 705/26.8 |
| 2016/0092902 | A1* | 3/2016 | Storry | G06Q 30/0633 705/14.26 |
| 2016/0132955 | A1* | 5/2016 | Dabral | G06Q 30/0226 705/14.27 |
| 2016/0189281 | A1* | 6/2016 | Kurnit | G06Q 30/0609 705/26.8 |
| 2016/0260319 | A1* | 9/2016 | Jeffery | G08C 17/02 |
| 2017/0323376 | A1* | 11/2017 | Glaser | G06Q 30/0643 |
| 2018/0075427 | A1* | 3/2018 | Greenberger | G06Q 20/389 |
| 2020/0258141 | A1* | 8/2020 | Habraken | G06Q 30/0641 |
| 2022/0114569 | A1* | 4/2022 | Bronicki | G06V 10/82 |
| 2022/0292465 | A1* | 9/2022 | Schnitt | G06N 3/09 |
| 2024/0354835 | A1* | 10/2024 | Ramesha | G06Q 30/0631 |

OTHER PUBLICATIONS

International Search Report dated Feb. 4, 2025; World Intellectual Property Organization; Application No. PCT/IB2024/059167.

* cited by examiner

SYSTEM AND METHOD FOR PROVIDING CUSTOMIZABLE CHECKOUT EXPERIENCES

FIELD OF THE INVENTION

Embodiments of the present disclosure relate to a system and method of providing a customizable ecommerce checkout experience. More particularly, embodiments of the present disclosure relate to a system and method of providing an optimized e-commerce checkout.

DESCRIPTION OF THE PRIOR ART

Electronic commerce (e-commerce) is the buying and selling of goods and services over a communications network, such as, for example, the internet. E-commerce web pages allow merchants to display their products or services in a virtual store. A consumer browses the virtual store and identifies products or services which they would like to purchase. They then add these goods and services to a virtual shopping cart. When the consumer has added all of the desired goods to their virtual shopping cart, they proceed to a checkout process in which they pay for the items in their virtual cart.

There are many ways in which a consumer can access an e-commerce website. For example, some consumers may shop using their mobile device, such as a mobile phone or tablet, while others may access the e-commerce web page on a laptop or desktop computer. Furthermore, the way in which the consumer accesses the webpage can also vary. For example, the consumer may access the e-commerce web page directly, may access it through an advertisement link on a webpage, or may access it through an advertisement link in social media. Alternatively, the consumer may have received an email promoting the e-commerce site or may have visited the site previously and received an email reminder that they have left items in their virtual shopping cart. Current technology provides the same checkout experience regardless of the manner in which the user accesses the website. While some checkout experiences have different viewing settings depending on the type of device used by the consumer, the fundamental properties of the checkout experience are static.

Furthermore, with the exception of auto filling consumer information, there is no customization of the checkout experience based on the user's purchase habits, personal information, items in their cart, or payment preferences.

There is room for optimization and customization of checkout experiences based on user or device metrics.

SUMMARY OF THE INVENTION

Checkout flows enable retail brands to provide customized checkout experiences based on a customer's unique characteristics. A checkout flow includes the customer segmentation, flow selection, and metric generation stages. When a customer enters a checkout, a process begins to evaluate the customer's characteristics and categorize them into a customer segment. Each segment is served a different frontend, which is specified by the checkout flow identifier. The frontend includes a basic checkout experience, which is customized further by experience optimizers and business optimizers.

One embodiment pertains to a computer process for presenting a transaction experience, the computer process comprising the steps of: receiving a checkout request, receiving segmentation parameters, and based on the segmentation parameters, assigning a correlated checkout flow identifier. A checkout flow proxy then accesses a checkout flow database and uses the checkout flow identifier to retrieve the checkout flow associated with said checkout flow identifier from the checkout flow database. The checkout flow is then presented in a user interface to complete the transaction.

In a further embodiment the segmentation parameters are used to assign the transaction to one of a plurality of predetermined customer segments. Based on an assigned predetermined customer segment, the correlated checkout flow identifier is assigned to the transaction.

In yet a further embodiment, after presenting the checkout flow, metrics associated with each checkout flow are provided to the merchant.

In yet a further embodiment, the request for checkout is received at a merchant system. The merchant system retrieves customer metadata and passes the customer metadata to a segmentation system to complete customer segmentation based on said customer metadata.

In yet a further embodiment, upon receiving the assigned predetermined customer segment, one of a plurality of checkout flow identifiers associated with the assigned predetermined customer segment is assigned. Metrics associated with each of the plurality of checkout flow identifiers are then provided to the merchant.

In yet a further embodiment, the assignment of the checkout flow identifier is completed at the segmentation system; and the checkout flow identifier is passed from the segmentation system to the checkout flow proxy.

In yet a further embodiment, the assigned predetermined customer segment is passed from the segmentation system to the checkout flow proxy and the checkout flow proxy assigns the checkout flow identifier.

In yet a further embodiment, the metadata includes at least one or more of the following: device type, screen size, cart status, method of accessing merchant webpage, customer persona, customer location, and cookies.

In yet a further embodiment, in the step of presenting checkout flow to complete for the transaction, the checkout flow proxy communicates directly or indirectly with a payment gateway provider to complete an electronic payment.

Another embodiment pertains to a system for making and evaluating check out flows for facilitating transactions comprising a merchant system for receiving a checkout request, a segmentation system for segmenting metadata associated with said checkout request into a customer segment, a flow identifier that is associated with the customer segment, and a checkout flow proxy configured to communicate with a checkout flow database. The checkout flow database contains a plurality of checkout flows each associated with a unique flow identifier. The checkout flow proxy is configured to retrieve the checkout flow associated with said checkout flow identifier from the checkout flow database. The checkout flow proxy is also configured to communicate the checkout flow associated with said checkout flow identifier to the merchant system. A user interface is then used for presenting the checkout flow associated with the checkout flow identifier to a user.

In a further embodiment, the system further comprises a second user interface for presenting metrics associated with each of said plurality of checkout flows.

Another embodiment pertains to a checkout flow management system comprising a checkout flow proxy configured to receive customer segmentation data and associate the customer segmentation data with a checkout flow identifier, and a checkout flow database comprising a plurality of checkout flows each identified with a unique checkout flow identifier. The checkout flow proxy has a processor that is used to match the checkout flow identifier with said corresponding checkout flow and is configured to communicate the corresponding checkout flow to an external user.

BRIEF DESCRIPTION OF THE DRAWINGS

The features of the invention will become more apparent in the following detailed description in which reference is made to the appended drawings wherein.

DETAILED DESCRIPTION OF THE INVENTION

The description pertains to a system and method to facilitate a transaction between a customer and a brand or store. In the preferred embodiment, this transaction is an e-transaction that occurs over a communications network. Alternatively, one embodiment of the system is implemented for in-person transactions. In particular, the description pertains to customizing checkout flows to optimize various metrics, such as conversion, average order value and customer lifetime value. Conversion in this document refers to the e-commerce metric which reflects the success and/or profitability of an e-commerce store. Conversion is calculated by dividing the total number of orders placed by the number of unique visits. For the purposes of this disclosure, the terms brand and store are used interchangeably to refer to an online merchant.

During the e-shopping process, a store is most likely to lose an order during the checkout process. If the checkout process presents any friction or challenges for the user, they are more likely to abandon their order. Reducing friction and challenges for the user during the checkout process ultimately results in higher conversion for the store. However, each customer may have different checkout needs. Adapting the checkout flow to meet a particular users' needs allows for a store to optimize conversion.

In the context of this document, the term checkout experience is used to refer to the pathway a shopper follows during an online checkout process.

Figure 1:
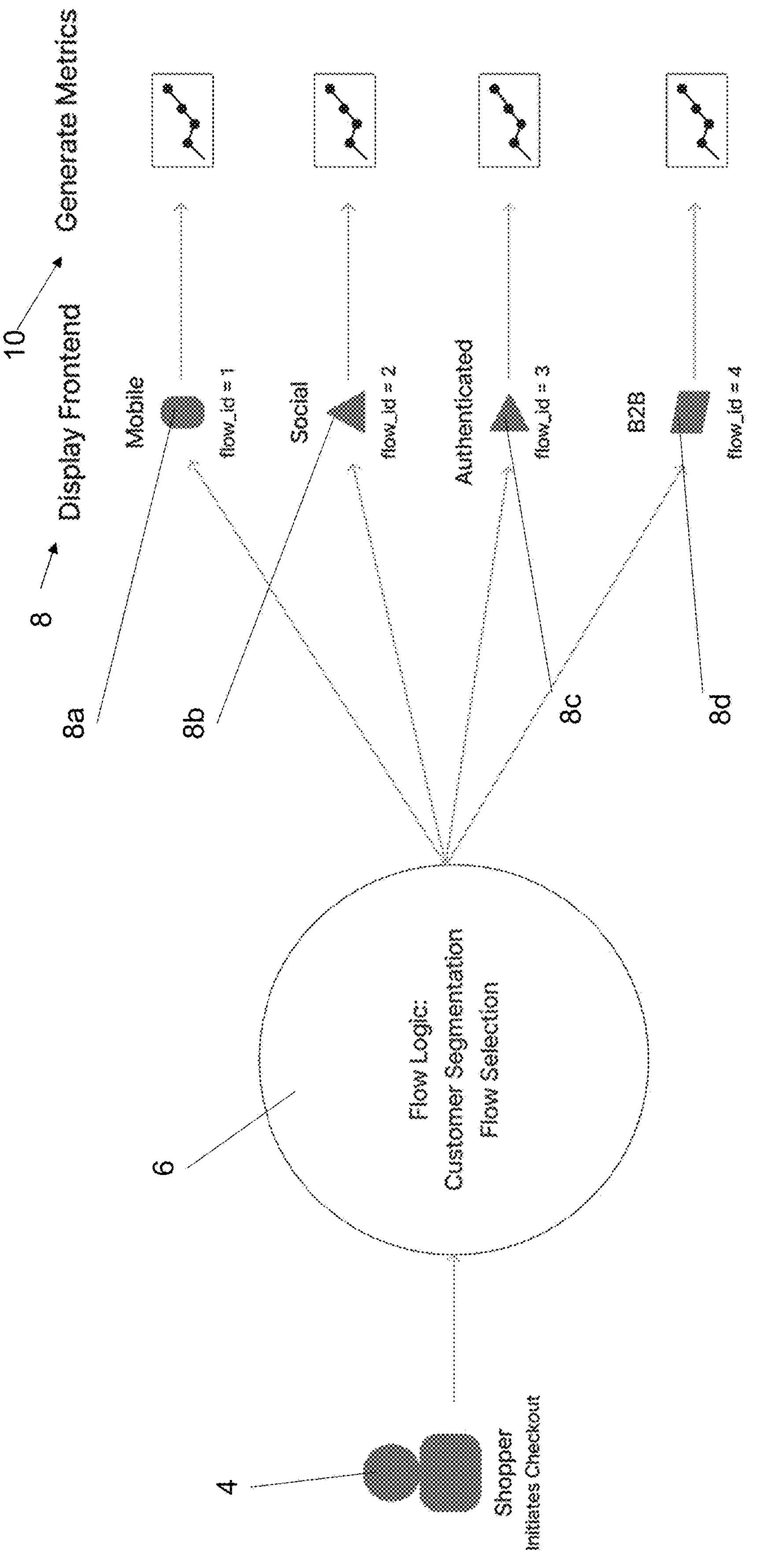
FIG. 1 is a schematic of the checkout experience.

The description pertains to a system and method of optimizing checkout experiences to maximize conversion. With reference to FIG. 1, a shopper 4 initiates the checkout experience in an online store. The shopper is then sorted using flow logic 6 (described below) to determine the appropriate checkout flow. A checkout flow is an optimized checkout experience designed to serve a specific set of shoppers based on a set of criteria, such as the type of device they're interacting with, their screen size, or the items in the cart. Based on the outcome of the flow logic, a customized checkout flow 8*a*-8*d* is selected. Each checkout flow 8*a*-8*d* has a unique frontend which is presented to the shopper 4 at step 8. Finally, checkout metrics are generated at step 10 to evaluate the conversion of each frontend.

Checkout Flows and Frontends

The frontend of a checkout experience is any interface a user interacts with that collects the information required by the backend to process an order. For instance, examples of frontends can include, but are not limited to:

- An online form a shopper fills out.
- The interface an employee uses during an in-store purchase.
- The conversational interface someone uses to place an order with a virtual assistant.

In the preferred embodiment, each frontend is composed of various components. Examples of customizable components include, but are not limited to, templates, business optimizers, and experience optimizers. A checkout flow is the process of evaluating which frontend experience to present to a shopper based on their unique characteristics. The following diagram shows examples of checkout flows with each of these customizable components.

Figure 2B:
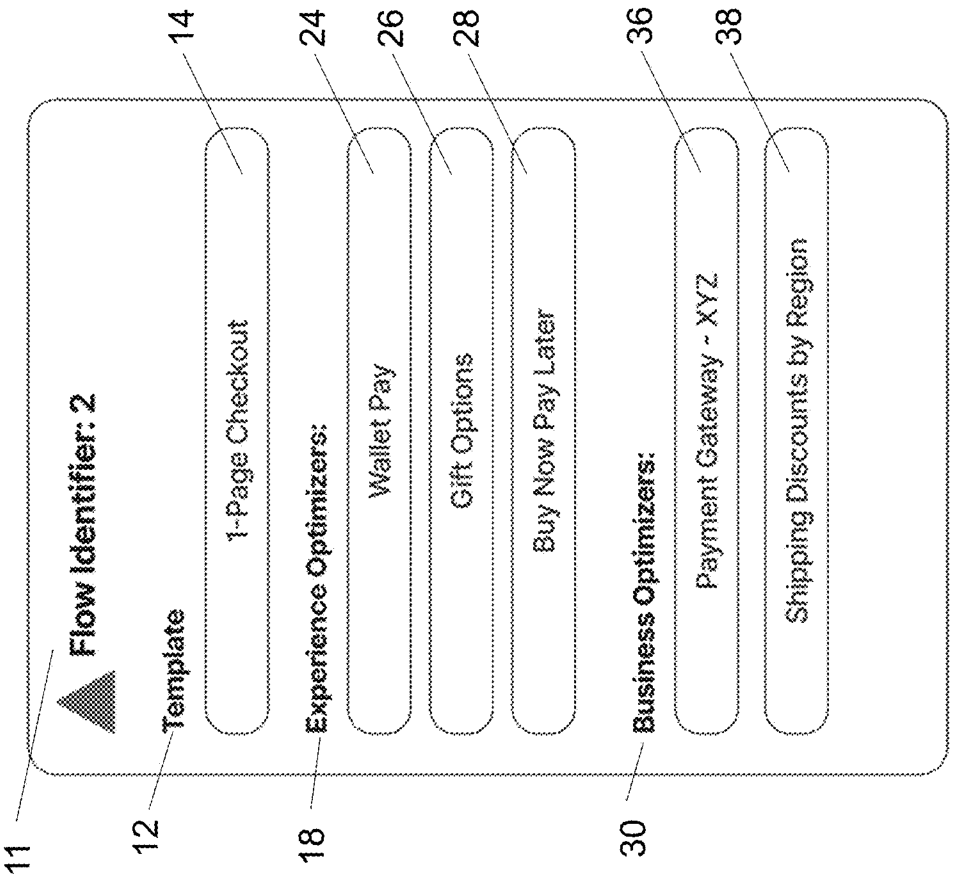
FIG. 2*b* shows a second example of a checkout flow.
Figure 2A:
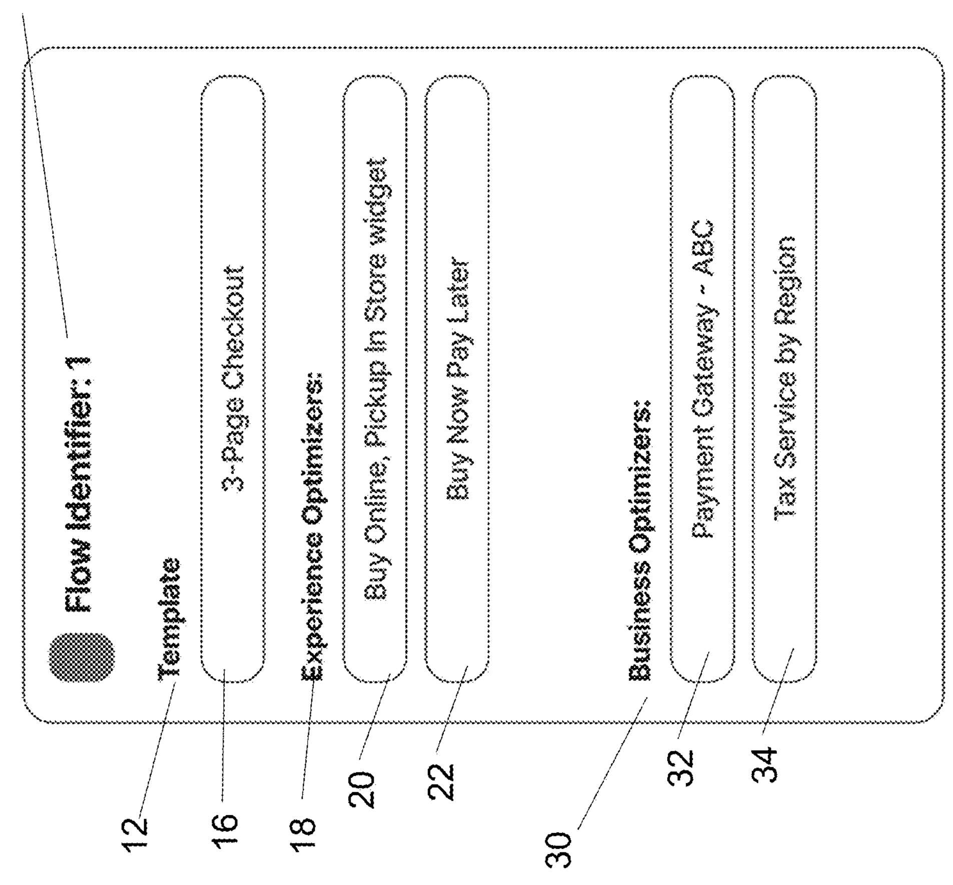
FIG. 2*a* shows a first example of a checkout flow.

FIG. 2*a* is an example checkout flow 8*a* which has been customized for use with mobile devices (as shown on FIG. 1), while FIG. 2*b* is an example checkout flow 8*b* which has been customized for use with purchases within desktop social media platforms. It can be appreciated by a person skilled in the art that the checkout flows shown in FIGS. 2*a* and 2*b* show components which are exemplary only and can be changed based on the needs of the brand, user or platform.

Each checkout flow 8*a* and 8*b* includes a checkout flow identifier 11. A checkout flow identifier is a unique string used to label a specific checkout flow and distinguishes it from other checkout flows. Each checkout flow further includes a template 12. A template is a frontend interface that is created to be reused and optimized. A template is ready to use without additional development. Common examples include a one-page template 14 as shown in checkout flow 8*b*. Typically, a one-page template would be used if the consumer device is a desktop or laptop computer. A one-page template is used if it is preferred that the entire checkout process is presented on a single page. In contrast, checkout flow 8*a* uses a three-page template 16. Three-page templates are typically used when the consumer device is a mobile device. In this template, the customer information, shipping information, and payment details are on separate pages. As can be appreciated, these are just two examples of possible templates. Other templates, including but not limited to a "one-click" or "buy-now" template, an authenticated customer template, or a buy from video template would be obvious to a person skilled in the art. In some preferred embodiments, templates include pop up or webpage integrated checkouts that allow a user to purchase a product without leaving, for example, a blog, social media platform or a video. This is advantageous as a user can complete checkout without leaving their current webpage or platform. For example, this type of template could be used if a user is reading a blog about how to do their own oil change, an advertisement for the tools needed can appear as a popup or integrated with the blog. The checkout process can also be initiated in the blog window or as a pop up to complete the purchase without leaving the blog page.

The checkout flows 8*a* and 8*b* further include the customizable experience optimizers 18. Experience optimizers 18 are adjustments that add or streamline steps within checkout to reduce friction, speed up the overall interaction, accept additional info to customize the order, or even provide special offers from within the checkout. Experience optimizers are used to push the limits of the interaction to get the most out of each new checkout session without losing out on valuable orders. Examples include but are not limited to, a "buy now pay later" widget, the option to pick up in store, customization options, add gift options, pay using a digital wallet or even a widget to propose a product to upsell the consumer before or after the checkout is complete. As an example, the checkout flow of FIG. 2*a* includes a "Buy Online, Pickup in Store" widget 20 and a "Buy Now Pay Later" 22 experience optimizer. The checkout flow of FIG. 2*b*, however, includes some different experience optimizers 18, including "Wallet Pay" 24," Gift Options "26 and "Buy Now Pay Later" 28.

Finally, the checkout flows 8*a* and 8*b* further include customizable business optimizers 30. Business optimizers are backend changes to the checkout that determine which configuration set powers the checkout experience based on unique business logic. Business optimizers allow the business to take advantage of any cost savings by matching their services to the right customers and reducing friction for the shopper during checkout. Examples of business optimizers 30 include widgets used to match specific payment gateways to different regions, apply shipping or other discounts based on customer type or other criteria, select different tax services for unique regions or for customers who qualify for specific exemptions. In the checkout flow 8*a* of FIG. 2*a*, business optimizers 30 include the payment gateway "ABC" 32 and a "Tax Service by Region" 34 function. Checkout flow 8*b* includes the payment gateway "XYZ" 36 and a function to determine shipping discounts by region 38.

Checkout flows allow a store or brand to combine templates, experience optimizers and business optimizers to enhance their checkout to their standards and preferences. Therefore, the brand or store can customize the shopping experience from start to finish, without needing to settle on a standard checkout.

Any number of interested parties can create a checkout flow. For example, the checkout flow platform, the brand or store, or a third-party partner would typically create the checkout flows. In one embodiment, a social media company may create a frontend that uses the disclosed checkout functionality but is styled to match the company's platform. Alternatively, a payment gateway provider may create a frontend that optimizes the use of their own payment method.

Figure 3:
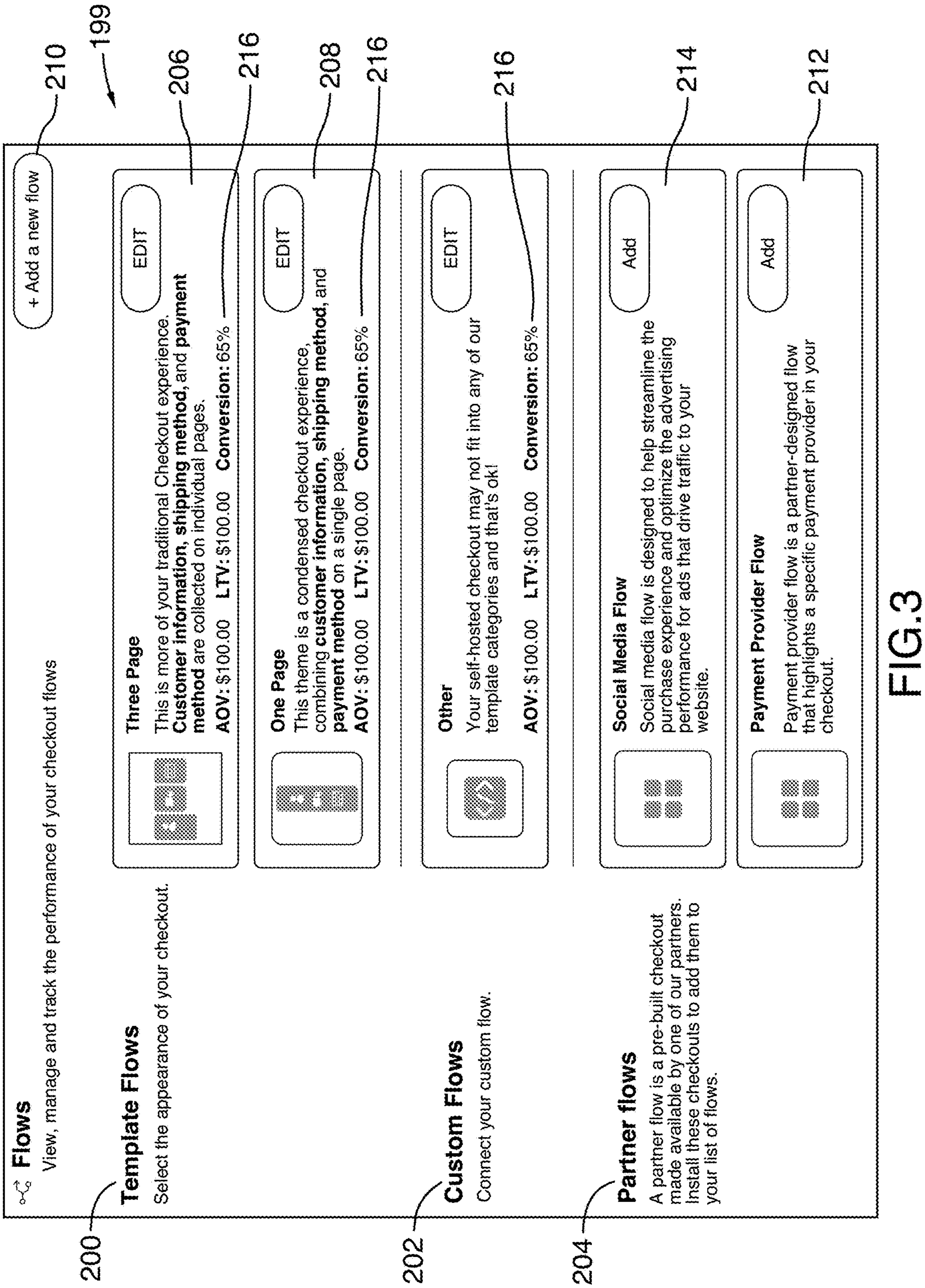
FIG. 3 shows and example of a user interface for managing checkout flows.

There is no limit on the number of flows. Flows can be easily created, modified, deleted, or archived via an administrative interface. One example of a user interface 199 is shown in FIG. 3. In this preferred embodiment, the flows are divided into three main flow types, template flows 200, custom flows 202, and partner flows 204. Checkout flows included in the template flows 200 would include premade flows. While the examples included for illustration purposes herewith are basic flows including a three-page flow 206 and a one page flow 208, template flows can include any flows set by the checkout flow platform.

Figure 10:
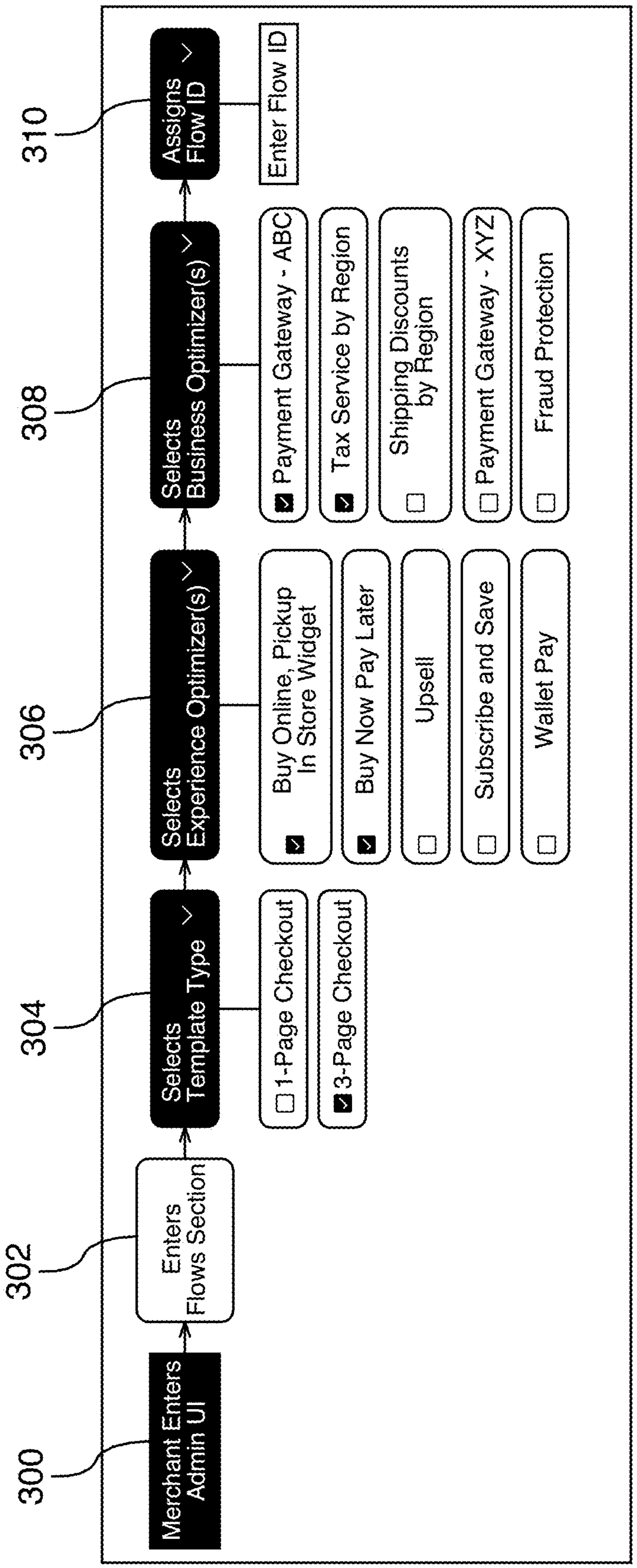
FIG. 10 is a flow chart depicting how a checkout flow creation wizard system is implemented to facilitate creation of custom checkout flows.

Template flows 200 can also include flows that are designed by the merchant using a combination of predetermined templates, experience optimizers and business optimizers. In one embodiment, template flows are created using a flow creation wizard. FIG. 10 shows an example of how a user interface might guide a merchant through the steps of creating a checkout flow. The merchant would enter the administrative user interface at step 300 and navigate to the flows page at 302. One possible example of the flow page is shown in FIG. 3. The user clicks the "add a new flow" button (see 210 in FIG. 3) and is prompted to select the template from the available options (step 304). In the example of FIG. 10, the user chose to use a three page checkout template. The user then proceeds to the next step 306 where they are prompted to select the experience optimizers from the available options. The list of available experience optimizers in FIG. 10 is used for example purposes only and does not include all available options. Other options would be obvious to a person skilled in the art. In this example, the user has chosen "Buy Online, Pickup in Store widget" and "Buy Now Pay Later". In step 308, the user is prompted to select the business optimizers from the available options. As with the experience optimizers, the list of FIG. 10 is used as an example only and does not include all available options. Other options would be known to a person skilled in the art. In this example, the user chose "Payment Gateway-ABC" and "Tax Service By Region". They would proceed to the next section of the wizard. They would be prompted to choose a checkout flow identifier for this flow 310, which can be any string.

Custom flows 202 can be created by a merchant in cooperation with the checkout flow platform. Custom flows 202 include flows with front ends that are designed by the merchant. Alternatively, the merchant can hire the appropriate entity, like a software development company or other agency to design their flow. Custom flows allow the merchant to customize the front end of their flows to suit their particular customer segments. The checkout flow platform provides the necessary functionality on the backend, and the merchant can design their own frontend to suit their needs. Each of these custom flows are all associated with a unique checkout flow identifier. The custom flow appears in the user interface (see FIG. 3) alongside the other checkout flows used by the merchant. This allows a merchant to create and use a custom flow that they can track along with any wizard created flows, template flows or partner flows.

Finally, there are partner flows 204. Partner flows 204 are designed to work with specific platforms or business partners. For example, payment gateway providers that partner with the checkout flow platform may design their own partner flows to make available to merchants that highlight their payment methods. Alternatively, partner flows could include social media flows 214 which are designed to work within online platforms. One example of this includes social media platforms which are discussed in detail below.

Social Media Example

In a preferred embodiment, checkout flows are customized for social media platforms. Often, users will see a product advertised in social media that catches their eye. They would then click on the product and be taken to the brand's page to facilitate a purchase. However, many users find this method cumbersome and abandon the purchase or simply choose not to click the link as they would prefer to keep scrolling through their social media feed. Social media specific checkout flows allow for a user to purchase a product advertised on social media without losing their spot in their feed. This reduces friction of the checkout and increases conversion. For example, if a user is scrolling through social media and sees an advertisement for a pair of sunglasses that they would like to purchase, a social media checkout flow could be used to purchase the sunglasses. This allows the user to purchase the item and then simply, just continue scrolling through their feed.

Figure 9:
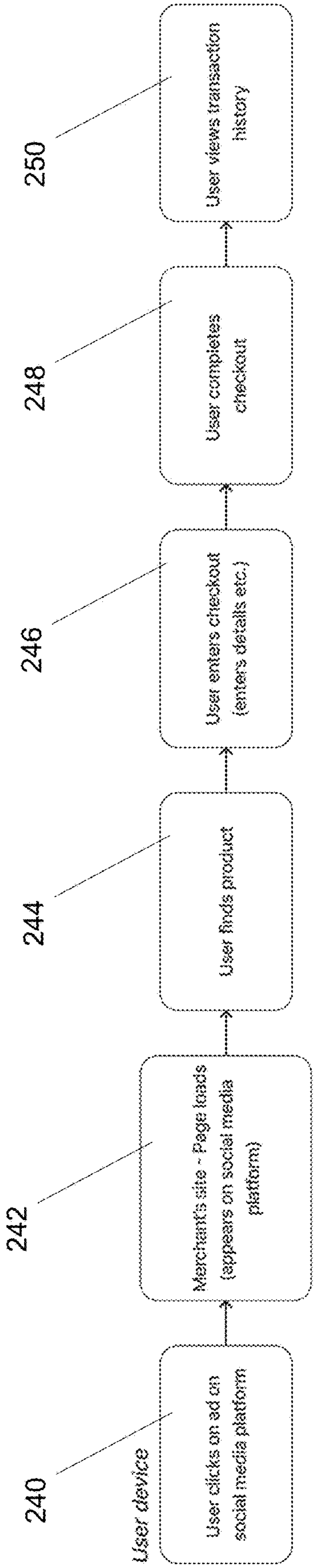
FIG. 9 is a flow chart of how the system is implemented in a social media environment.

FIG. 9 illustrates one example of how social media templates can be used to facilitate checkout within the social media platform. The user clicks on an ad within the social media platform at step 240. This triggers the merchant's site to load within the social media platform at step 242. The user finds the product they would like to purchase 244 and enters checkout 246. Alternatively, if the advertisement contains links to a particular product, simply clicking that link could take the user straight to the checkout page with the product in their virtual cart. The user then completes checkout at step 248. Optionally, the user could view their transaction history within the social media application 250.

In-Person Retail Example

Figure 11:
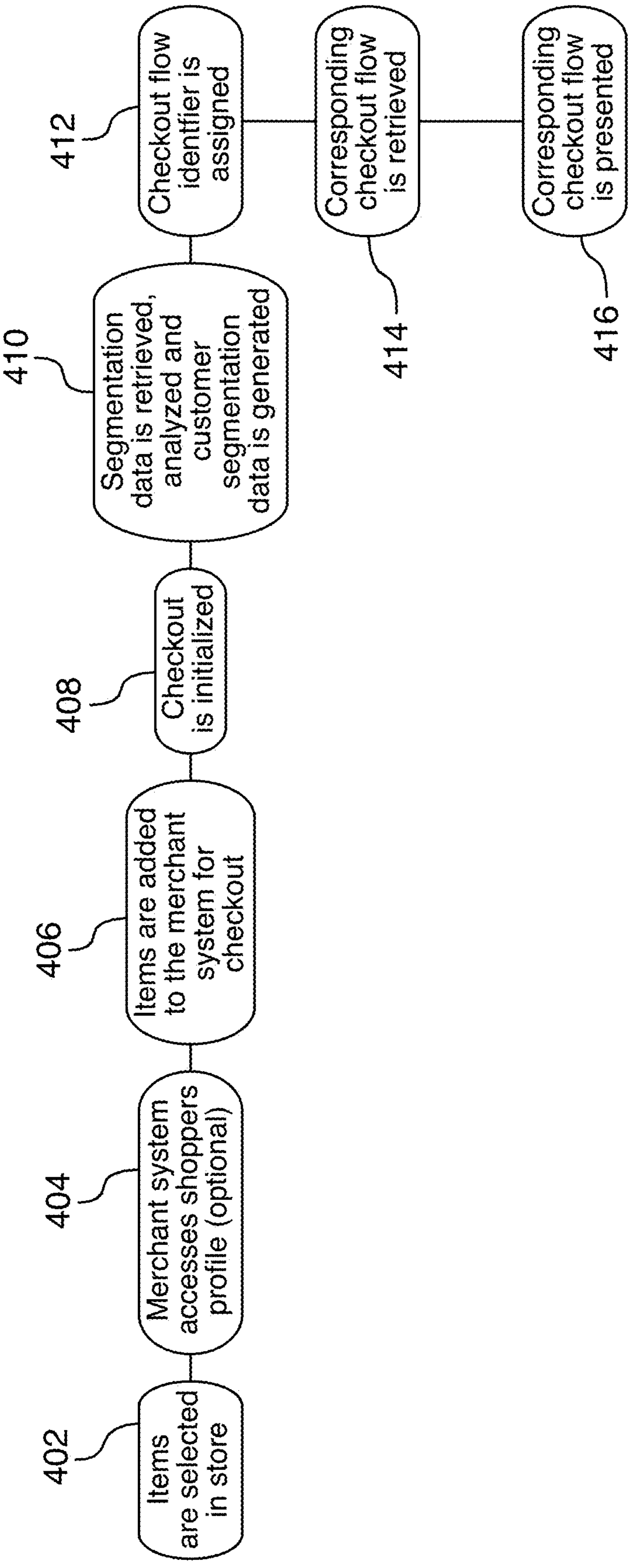
FIG. 11 is a flow chart of how the system and method is implemented in a brick-and-mortar retail environment.

In one embodiment, the system is implemented in an in-person retail environment. For example, consider an example of a brand that does business both online and at brick-and-mortar stores. Shoppers can drop by the brick-and-mortar store or, in the case of an upscale brand, make an appointment to have a sales associate help with their selections. FIG. 11 shows an example of how the system and method can be implemented in a physical retail location. The retail location custom checkout method 400, begins as with any shopping trip, by selecting items to purchase 402. The shopper proceeds to checkout where the merchant system can optionally access the shopper's store profile by any known method 404. The items selected are scanned or otherwise entered into the checkout system 406. A checkout requested is initialized 408 and segmentation data from at least the merchant system, and optionally the shopper's profile, is used as input to generate customer segmentation data 410. With the customer segmentation data, a checkout flow identifier is assigned 412. This can either be done by the segmentation system, merchant system or by the checkout platform. The checkout flow identifier is used by a checkout proxy to retrieve the corresponding checkout flow from the checkout flow database (step 414). Finally, the corresponding checkout flow is presented on the merchant system 416.

Figure 12A:
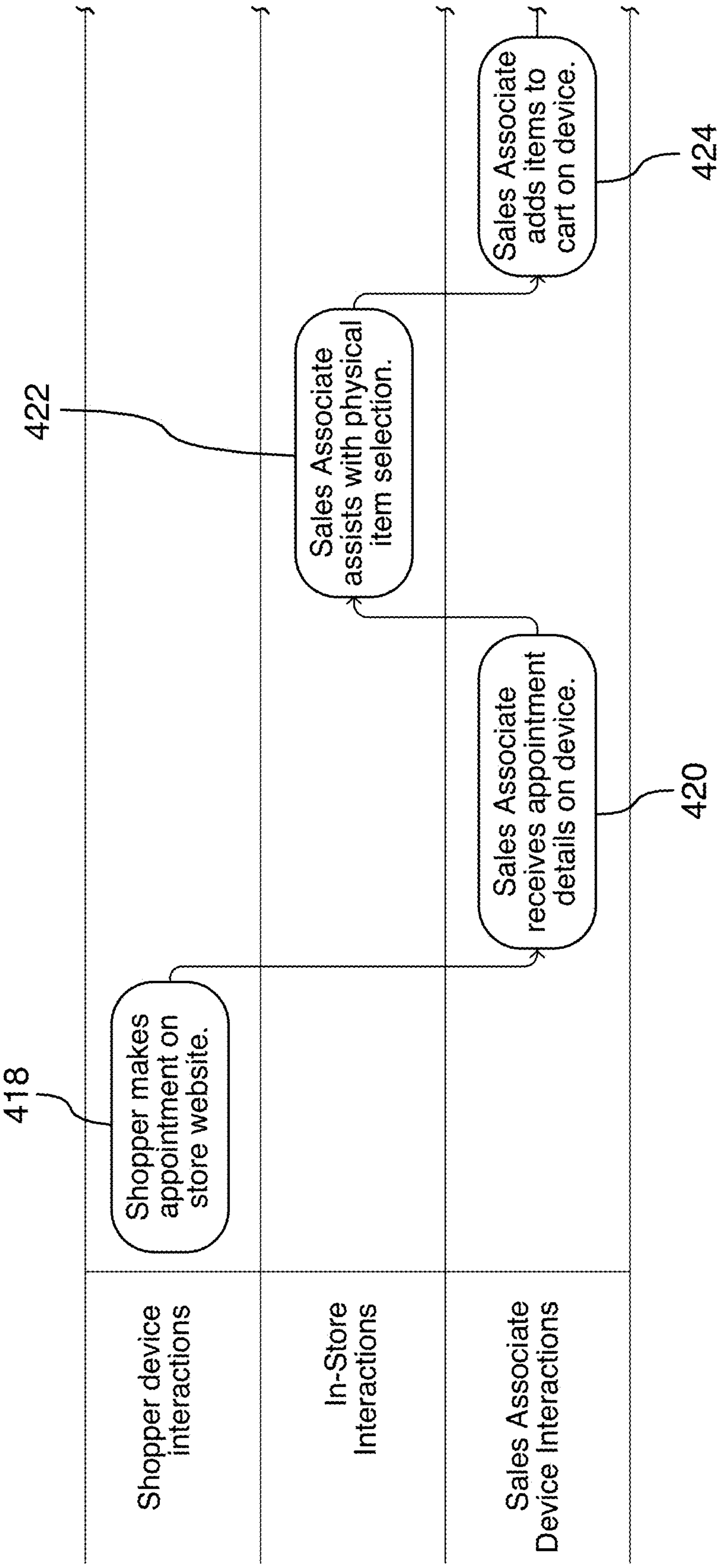
FIGS. 12A and 12B collectively illustrate a flow chart of how the system and method is implemented in a brick-and-mortar retail environment using a shopping assistant.
Figure 12B:
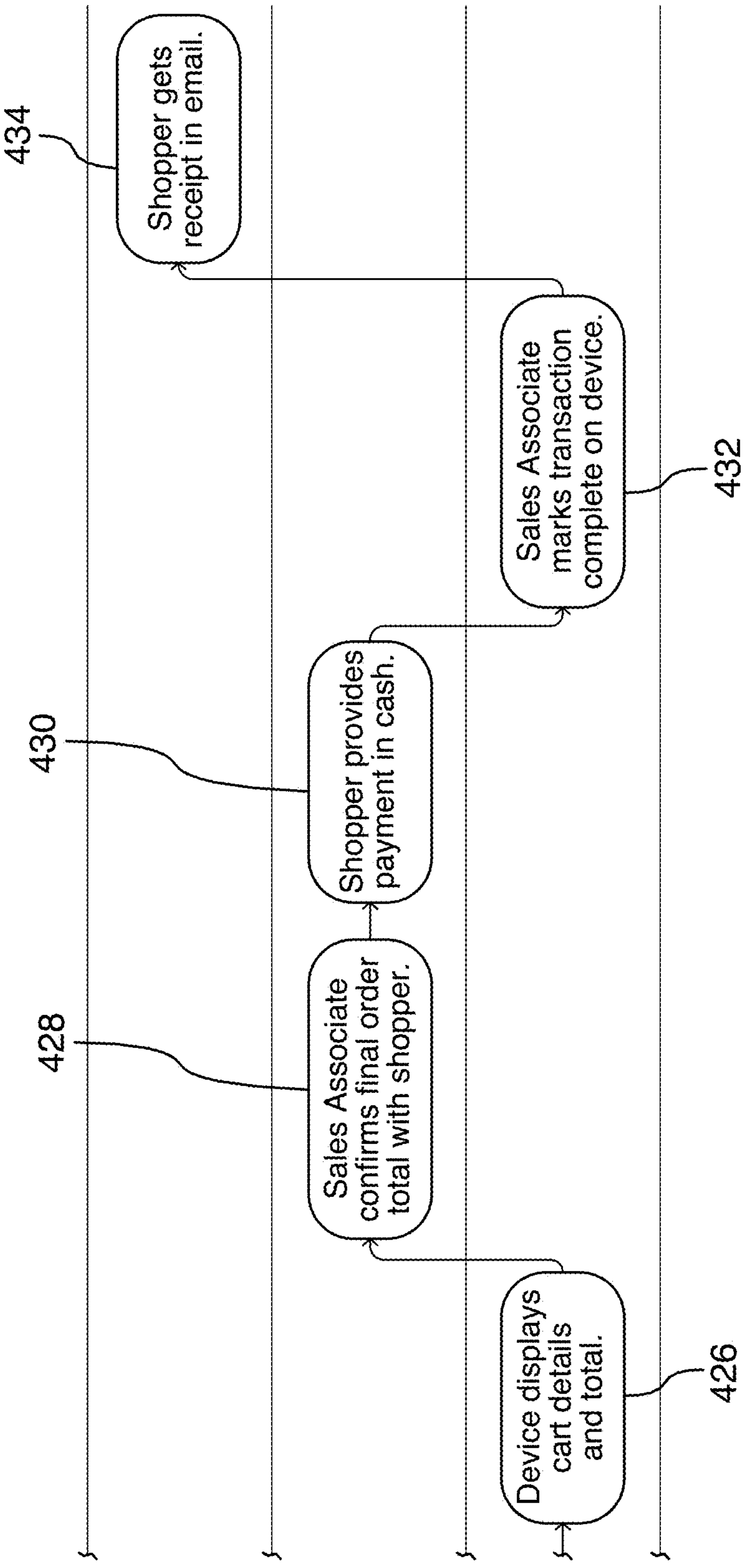

One example of the implementation of the in-store retail system in method is use for a personalized shopping and checkout experience in a store. In this example, the user uses their own device to book an appointment at a brick-and-mortar store 418 (see FIGS. 12A and 12B). The merchant system receives the appointment details 420 and the shopper's brand profile, typically through a computer network. In one embodiment, the sales associate has a mobile device, such as a tablet that displays the shopper's profile. This profile could include information about the shopper, such as size, membership discounts, past purchases, and other user information or preferences. During the appointment, the sales associate optionally has access to the shopper's profile to assist with the selection of items around the store 422. In one embodiment, the tablet is equipped with the functionality of scanning an item and adding it to a virtual cart for purchases. Alternatively, other methods of adding items to a digital checkout cart 424 would be known to a person skilled in the art. When the shopper is ready to check out, the sales associate presents the user their cart on the tablet 426 (or by any other suitable method) and optionally asks them to confirm the details 428. The shopper confirms the details (this step is completed as a customer courtesy but is not a required step in the checkout process). The checkout request is initiated, segmentation is completed, the appropriate checkout flow identifier is assigned, and the corresponding checkout flow is displayed on the merchant system. In this example, the custom checkout flow associated with the assigned checkout identifier, likely would not prompt the shopper for shipping information since this is an in-store shopping experience. The shopper pays in an appropriate manner, including but not limited to cash, cheque, credit card, debt 430. The sales associate tenders the payment either using the tablet, a traditional point of sale, or by accepting cash or cheque. The order is indicated as paid on the merchant system 430 and the transaction is completed. If appropriate, the sales associate optionally triggers an email receipt to the shopper 434. Alternatively, the email receipt can be automatically sent to the customer.

In this example scenario, segmentation data used to select the appropriate checkout flow identifier includes information about the order and shopper which can be pulled from the shopper's profile on the tablet. The location of the purchase, in-store instead of online, and the geographic location of the store are also considered in segmentation. Based on this a checkout flow identifier is determined and the associated custom checkout flow is presented to the associate and shopper. For example, if the customer profile showed that the shopper was a member of a promotion of the brand that entitled them to a discount, the checkout flow would include an experience optimizer to apply the discount. Furthermore, since the purchase occurred in-store, the checkout flow would exclude any requests for shipping details. The brand may also design their checkout flows to utilize business optimizers, which, for example, include taxes that are calculated based on the store location, and no payment gateway is required because the payment was exchanged in cash.

It should be noted that the same system could be implemented at traditional point of sale systems or at self checkout systems.

Checkout Flow Selection

Figure 4:
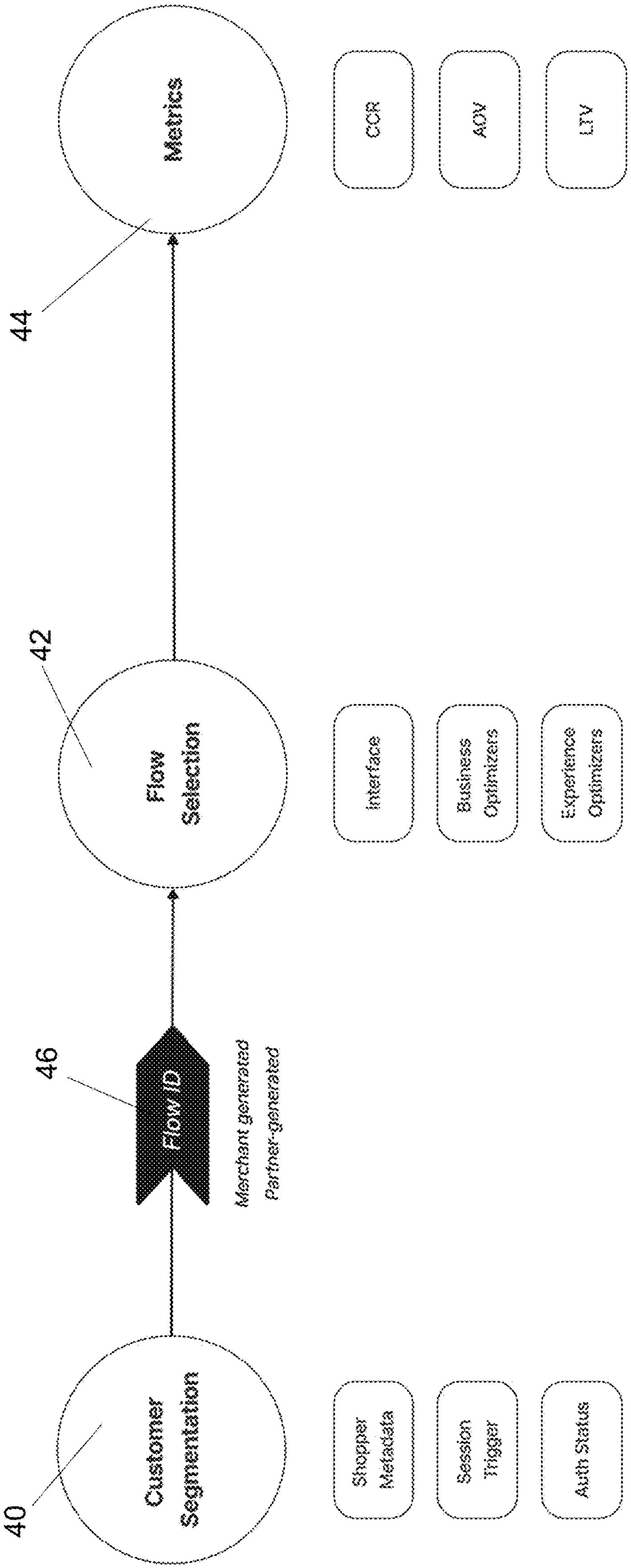
FIG. 4 is schematic of overall checkout process integrating the selection of checkout flow identifiers.

In the preferred embodiment shown in FIG. 4, the selection of a checkout flow comprises the following stages:

Customer Segmentation 40.

Flow Selection in Checkout Flows Proxy 42

Metric Generation 44

Customer Segmentation

The customer segmentation process can be performed by an existing customer segmentation tool or can be implemented by the merchant. A customer segment is a collection of parameters that specify which data is used to evaluate each shopping session, such as device, loyalty status, or geographical location. Each brand or store can create any number of customer segments as they see fit. Each merchant can choose the customer segmentation tool they implement. Many existing segmentation tools use user meta-data (among other metrics) to segment their customers. Some examples of meta-data typically used in segmentation includes, but is not limited to, browser data, information from the ecommerce platform, and IP address to determine geographic location.

Figure 5:
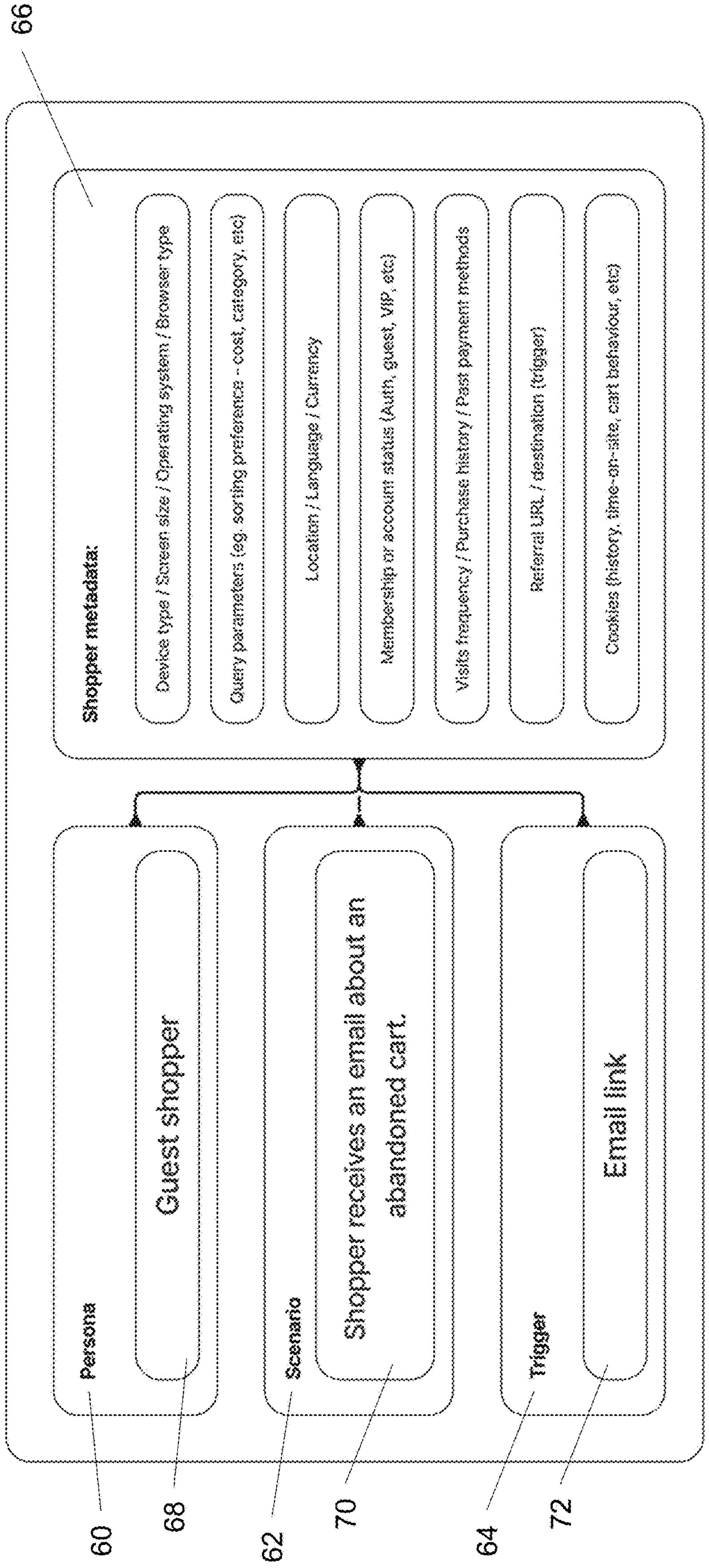
FIG. 5 is a depiction of possible information that could be used to create shopper segments.

FIG. 5 shows examples of customer segmentation based on persona 60, scenario 62, trigger 64, and shopper metadata 66. There are many different options for customer segments. For example, the persona of the shopper could be a guest shopper 68, as shown in FIG. 5, or alternatively a customer with an account, an employee, or a customer with special privileges. For example, one persona could be a customer who has bought a special membership or discount card.

Scenarios can also vary. In FIG. 5, the example Scenario is that a shopper abandoned their cart and then received an email 70 to remind them. They followed the link in the email to their waiting cart. The trigger in this case, was an email link 72 provided in the email reminder.

In another embodiment, the scenario includes a shopper reading a blog about several products of interest. The shopper clicks a widget in the blog that allows them to check out on the page. In this case the widget in the blog would be the trigger.

In yet another embodiment, the scenario includes a social media user scrolling through their feed. The trigger in this embodiment, could be the user clicking an ad that enables them to check out from within the social media app.

Shopper information can also be used as a metric to determine the appropriate checkout flow. Shopper meta-data, for example, device type, screen size, operating system, browser type, query parameters (e.g., Sorting preference, cost, category, etc.), location, language, currency, membership or account status, visit frequency, purchase history, past payment methods, referral URL, destination (trigger), and cookies, can all be used alone or in any combination to determine the optimal checkout flow.

When a shopper clicks the checkout button, the shopper's information, for example persona 60, scenario 62, trigger 64 and shopper meta-data 66, is sent to customer segmentation software that identifies which important characteristics the shopper might have. Based on those characteristics, the software maps those characteristics to the appropriate checkout flow identifier with the appropriate template and optimizers (see step 46 of FIG. 4). The output of the customer segmentation process is the checkout flow identifier that is used to determine which checkout flow is to be used for the particular shopper experience.

By setting a checkout flow identifier on the order, the brand or store determines which frontend, each with a template customized with experience optimizers and business optimizers, should be displayed to the customer. The checkout flow identifier also enables the association of checkout metrics with a certain flow. The brand can then determine whether a particular checkout experience performs better than others. For example, key metrics 216, such as conversion, associated with each flow can be shown in the user interface 199 (see FIG. 3).

Flow Selection in Checkout Flows Proxy

Once customer segmentation is complete, the checkout flow platform serves the appropriate frontend experience to the shopper. This process is made possible by the Checkout Flows Proxy, which is an application layer that accepts API calls and retrieves the frontend experience that correlates with the checkout flow identifier.

Figure 6:
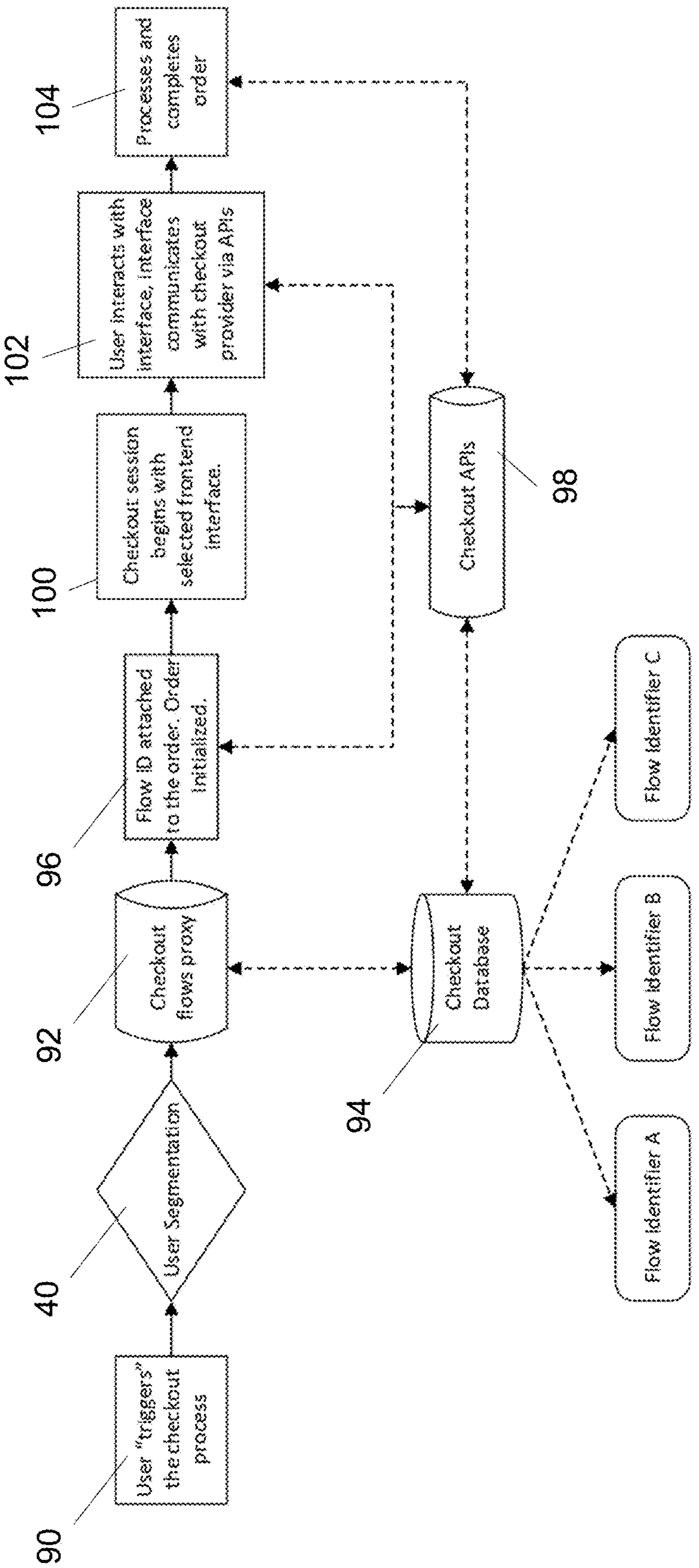
FIG. 6 is a schematic of the checkout experience.

With reference to FIG. 6, the user triggers checkout at step 90 and user segmentation, as described above occurs at step 40. After completion of the user segmentation, customer segmentation data is known and based on the customer segmentation data, a corresponding checkout flow identifier is assigned. The checkout flows proxy 92 accepts the checkout flow identifier. In one embodiment, the checkout flow identifier is determined by the segmentation system. In another embodiment, the customer segmentation data is communicated to the merchant system and the merchant system assigns the checkout flow identifier. In yet a further embodiment, the customer segmentation data is communicated to the checkout flow proxy which assigns the corresponding checkout flow identifier. Communication of either the checkout flow identifier or the customer segmentation data to the checkout flow proxy can take various forms. In one embodiment, the information is communicated directly between the segmentation system to the checkout flow proxy. Alternatively, the segmentation system communicates the information back to the merchant system which then passes the information to the checkout flow proxy. Using the determined checkout flow identifier, the checkout flows proxy 92 retrieves the appropriate frontend from the checkout database 94. The checkout flow database contains all the checkout flow identifiers and predetermined characteristics, such as template, experience optimizers and business optimizers associated therewith.

Once the checkout flow has been obtained from the checkout database 94, the checkout flows proxy 92 makes an API call 96 to the checkout API 98 to initialize the order. This call contains various information about the order, such as the line items, customer information, payment information, and the checkout flow identifier field. While this is one example of how APIs are used to facilitate communication between the merchant, segmentation and checkout flow system, a person skilled in the art would be aware of alternative methods of communication.

The checkout flows proxy 92 serves the selected frontend to the shopper at step 100. The shopper interacts with the selected frontend at step 102 and completes the checkout. The order is processed in the traditional manner at step 104.

Figure 7:
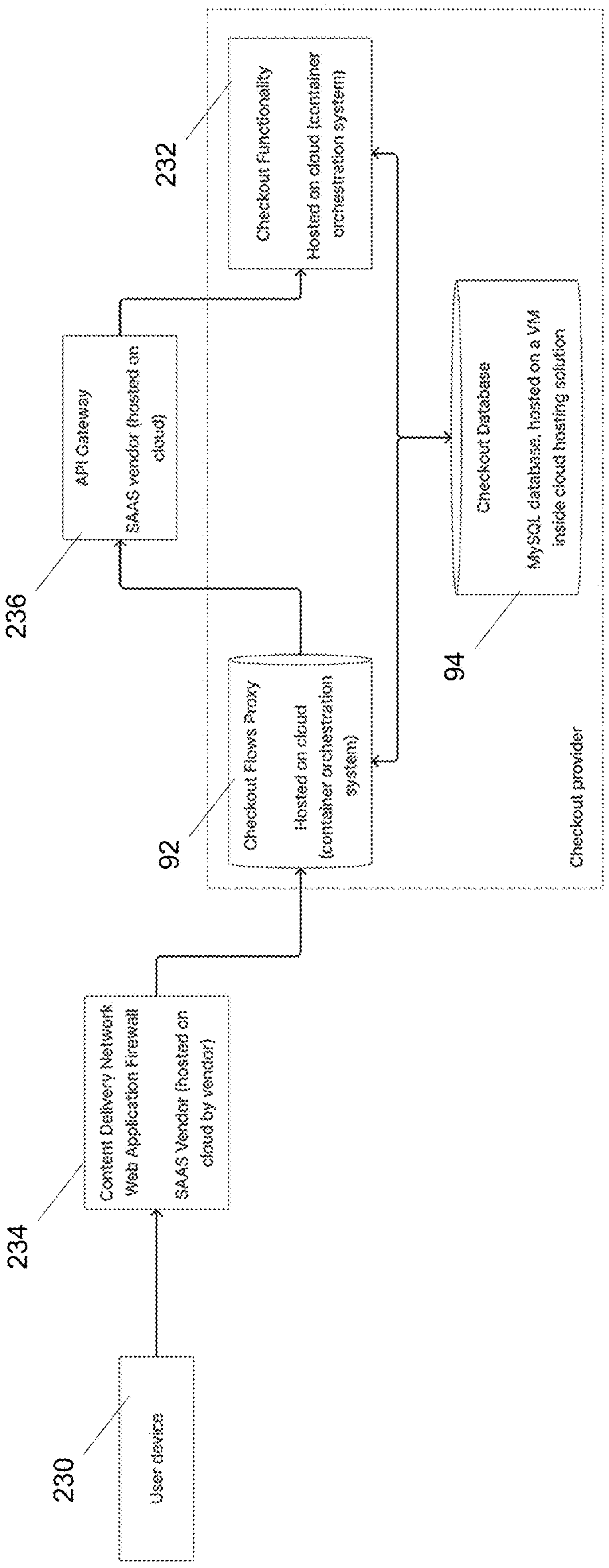
FIG. 7 is a flow chart of the system.

With reference to FIG. 7, checkout is triggered on a user device 230. An application security layer 234, preferably in the form of a content delivery network incorporating a web-based application firewall is used to provide the necessary security for the purchase and routes the user to the correct application. The checkout flow proxy 92, communicates with and retrieves the appropriate flow based on the checkout flow identifier from the checkout database 94. The checkout database 94, in the preferred embodiment, is preferably a MySQL database hosted on a virtual machine inside of a cloud hosting solution. The checkout flows proxy 92 makes the appropriate API calls to the checkout flow platform. The API gateway 236 accepts API requests and directs them to the appropriate microservice or checkout functionality within the checkout flow platform. The checkout functionality 232 and checkout proxy 92 are typically hosted on a cloud. This system allows for a multi-tenant solution wherein multiple checkout flows can either be shared by various merchants or kept private depending on the user's needs and/or preferences.

Metric Generation

In the preferred embodiment, after each order is completed (or left abandoned), it continues to be associated with its checkout flow identifier. Each order is evaluated against a set of metrics. Examples of metrics include, but are not limited to, average order value, checkout completion rate, customer lifetime value.

In one embodiment, these metrics are aggregated on a per-flow basis and presented to the user in a dashboard (see FIG. 3, for example). There are a multitude of ways in which a store or brand could be presented with the metrics. For example, the dashboard could show average metrics for each flow over a rolling 30-day window. Alternatively, it could show the lifetime performance of each flow.

The success of a checkout flow can be based on the correlation between these metrics, the unique brand, and targeted segment. Brands can experiment with adjusting their flows based on each of these metrics and identifying where the biggest impact lies for their store. For example, the merchant or a selected partner could set up a test, in which two or more flows are tested against one another to optimize a particular metric.

Optimization Through Checkout Segment Testing

Checkout flows allow brands to match a shopper to the best checkout for them, and brands can test experiences against one another in order optimize the interaction and maximize the completion rate, average order value, and lifetime value.

Brands or stores can quickly optimize and iterate upon their checkout flows in a number of ways. For example, brands or stores can pair one flow with certain segments to test with which group the flow is most successful. Brands can also pair several flows with one customer segment to identify which optimizers perform best. An example of this technique is shown in FIG. 8.

Figure 8:
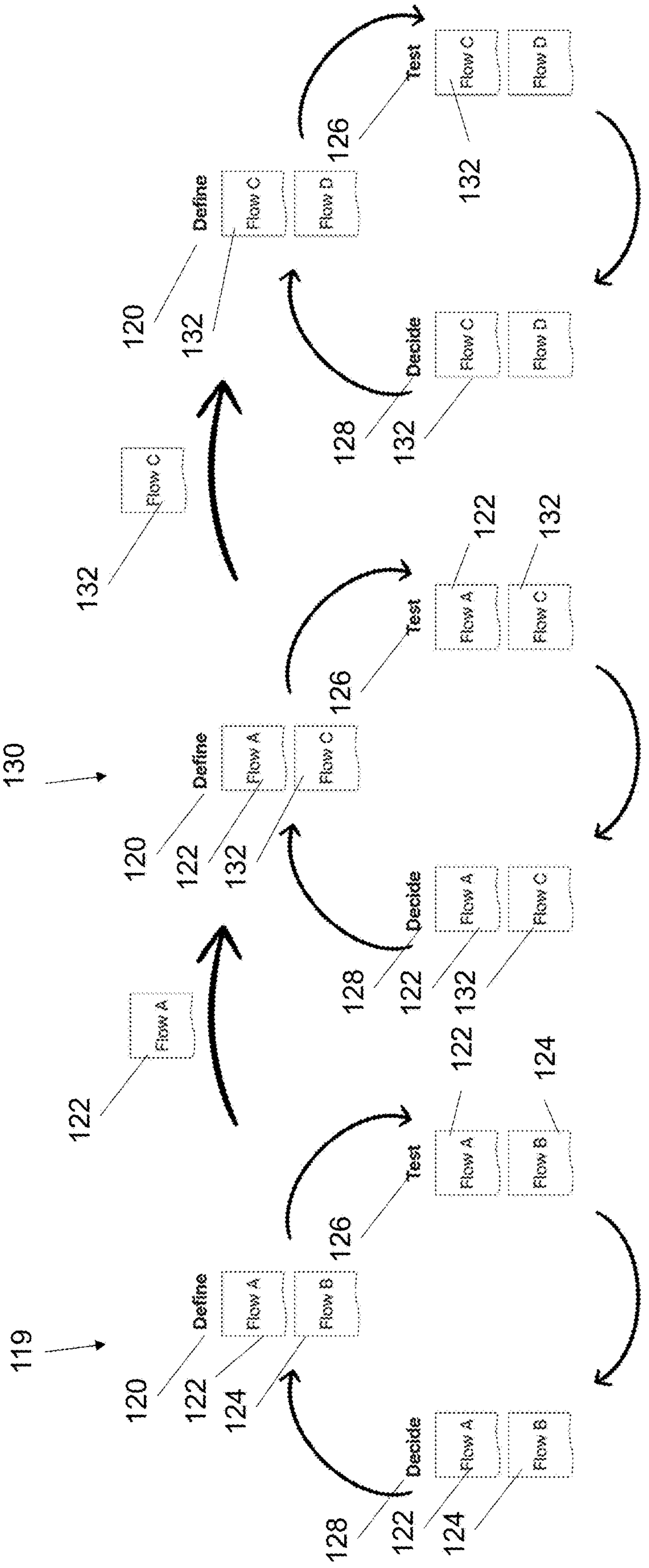
FIG. 8 is a depiction of the testing of various checkout flows.

The testing example of FIG. 8 has at least 3 stages: define, test and decide. While this particular example shows only two flows being tested against each other at a time, it would be understood by a person skilled in the art that any appropriate number of flows could be tested simultaneously. A brand or store may, for example, wish to test 4 flows against a particular segment at one time provided they have sufficient shopper flow.

The brand starts with a first comparison 119. In the Define stage 120, the brand creates two or more flows, Flow A 122 and Flow B 124, and splits traffic of the determined segment between them. Flows can easily be copied and tweaked, so the brand sets up two or more flows that are almost identical but have one distinctive difference, such as the presence of a "Buy Now, Pay Later" button in Flow B 124.

In the Test stage 126, the brand runs the test for a predetermined amount of time or for a predetermined number of purchases. Other metrics for determining the duration of the test would be known to a person skilled in the art. The brand can use a variety of tools to segment their traffic and serve a portion with Flow A 122 and Flow B 124. This test is often time-boxed for a certain period of time based on the data required and the amount of traffic on the site.

In the Decide stage 128, the brand evaluates each flow's performance on the basis of any suitable metric, such as, checkout completion rate, average order value, and customer lifetime value. The outcome of these metrics enable a brand to make a decision on which flow to continue using. For example, if the brand noticed better performance in Flow A 122, which did not have the "Buy Now, Pay Later" button, they would choose to continue with Flow A 122.

As shown in FIG. 8, this cycle can be repeated with different flow iterations. In the example of FIG. 8, the next iteration 130, the brand makes a different change and compares Flow A 122 with Flow C 132, which offers the "Buy Online, Pickup In Store" option. If Flow C 132 is more successful, the brand iterates upon Flow C 132. This cycle continues until the brand is satisfied they have the optimal flow for the given customer segment.

In an alternative embodiment, the system uses the metrics to automatically analyze and suggest optimized flows for each user segment as determined in the segmentation step.

The embodiments of the disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure, which is defined solely by the appended claims and applicable law. Moreover, it is noted that like reference numerals represent similar parts throughout the several views of the drawings.

It can be appreciated that the method steps of the present disclosure may be embodied in sets of executable machine code stored in a variety of formats such as, but not limited to, object code or source code. The executable machine code or portions of the code may be integrated with the code of other programs, implemented as subroutines, plug-ins, add-ons, software agents, by external program calls, in firmware or by other techniques as known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the various components of the overall system, any component of or related thereto, etc., or accessible or connectable thereto. Any application or module herein described may be implemented using computer readable/executable instructions that may be stored or otherwise held by such computer readable media.

It should be understood that the scope of the claims should not be limited to the embodiments disclosed herein but should be given the broadest interpretation consistent with the specification as a whole.

What is claimed is:

1. A computer process for generating a checkout flow user interface, the computer process comprising:

receiving, at a processor, a checkout request from a user device;

receiving, at the processor, segmentation parameters;

based on said segmentation parameters, assigning a correlated checkout flow identifier to the checkout request in a memory in communication with the processor;

accessing a checkout flow database via a checkout flow proxy, the checkout flow proxy using the checkout flow identifier to retrieve from the checkout flow database a machine-readable checkout flow definition associated with said checkout flow identifier, the machine-readable checkout flow definition comprising a template flow and a partner flow, the partner flow selected using a business optimizer based on the segmentation parameters, the checkout flow proxy comprising an Application Programming Interface (API) gateway; and generating, at the processor, a checkout flow user interface based on the machine-readable checkout flow definition, the checkout flow user interface comprising a template flow portion based on the template flow and a partner flow portion based on the partner flow;

transmitting, from the processor to the user device, the checkout flow user interface to a user at the user device;

receiving, at the processor, a checkout flow response based on the checkout flow user interface, the checkout flow response used by the API gateway to complete a transaction wherein said segmentation parameters are used to assign the transaction to one of a plurality of predetermined customer segments, the checkout flow proxy routing the transaction to one or more checkout microservices for processing via the API gateway, said checkout flow proxy communicating with a payment gateway provider selected based on the checkout flow identifier to complete an electronic payment; and based on an assigned predetermined customer segment, assigning the correlated checkout flow identifier in the memory.

2. The computer process of claim 1 wherein after transmitting the checkout flow user interface, transmitting to a merchant system metrics associated with each checkout flow.

3. The computer process of claim 2 wherein said request for checkout from the user device is received at the merchant system;

said merchant system retrieves customer metadata and passes the customer metadata to a segmentation system to complete customer segmentation based on said customer metadata.

4. The computer process of claim 3 further comprising:

upon receiving the assigned predetermined customer segment, assigning one of a plurality of checkout flow identifiers associated with the assigned predetermined customer segment; and providing the merchant system with metrics associated with each of the plurality of checkout flow identifiers.

5. The computer process of claim 4 wherein the assignment of the checkout flow identifier is completed at the segmentation system; and said checkout flow identifier is transmitted from said segmentation system to said checkout flow proxy.

6. The computer process of claim 4 wherein the assigned predetermined customer segment is transmitted from said segmentation system to said checkout flow proxy; and said checkout flow proxy assigns said checkout flow identifier in the memory.

7. The computer process of claim 3 wherein said metadata includes at least one or more of the following: device type, screen size, cart status, method of accessing merchant webpage, customer persona, customer location, and cookies.

8. A system for generating a transaction user interface, comprising:

a merchant system for receiving a checkout request from a user device;

a segmentation system for segmenting metadata associated with said checkout request into a customer segment;

a flow identifier associating the customer segment to the checkout request;

a checkout flow proxy configured to communicate with a checkout flow database;

the checkout flow database containing a plurality of machine-readable checkout flow definitions each associated with a unique flow identifier, the checkout flow proxy comprises an Application Programming Interface (API) gateway;

said checkout flow proxy configured to retrieve one of the plurality of machine-readable checkout flow definitions associated with said flow identifier, the retrieved machine-readable checkout flow definition comprising a template flow and a partner flow, the partner flow selected using a business optimizer based on the segmentation parameters;

said checkout flow proxy configured to generate a checkout flow user interface based on the retrieved machine-readable checkout flow definition;

said checkout flow proxy configured to transmit the checkout flow user interface associated with said flow identifier to the merchant system, the checkout flow user interface comprising a template flow portion based on the template flow and a partner flow portion based on the partner flow;

said checkout flow user interface for presenting the checkout flow associated with said flow identifier to a user at the user device said checkout flow proxy receiving a checkout flow response based on the checkout flow user interface, the checkout flow response used by the API gateway to complete a transaction wherein said segmentation metadata are used to assign the transaction to the customer segment, the checkout flow proxy routing the transaction to one or more checkout microservices for processing via the API gateway, said checkout flow proxy communicating with a payment gateway provider selected based on the checkout flow indentifier to complete an electrical payment.

9. The system of claim 8 further comprising a second user interface for presenting metrics associated with each checkout flow.

10. A checkout flow management system comprising:

a checkout flow proxy configured to receive customer segmentation data and associate the customer segmentation data with a checkout flow identifier;

a checkout flow database comprising a plurality of machine-readable checkout flow definitions each identified with a unique checkout flow identifier;

said checkout flow proxy having a processor used to match the checkout flow identifier with a corresponding one of said machine-readable checkout flow definitions, the matched machine-readable checkout flow definition comprising a template flow and a partner flow, the partner flow selected using a business optimizer based on the segmentation parameters;

said checkout flow proxy comprising an Application Programming Interface (API) gateway;

said checkout flow proxy generating, at the processor, a checkout flow user interface based on the machine-readable checkout flow definition, the checkout flow user interface comprising a template flow portion based on the template flow and a partner flow portion based on the partner flow; and said checkout flow proxy configured to transmit said checkout flow user interface to a user device;

said checkout flow proxy receiving a checkout flow response based on the checkout flow user interface, the checkout flow response used by the API gateway to complete a transaction wherein said segmentation data are used to assign the transaction to one of a plurality of predetermined customer segments, the checkout flow proxy routing the transaction to one or more checkout microservices for processing via the API gateway, said checkout flow proxy communicating with a payment gateway provider selected based on the checkout flow identifier to complete an electronic payment.

* * * * *